(12) United States Patent
Majer

(10) Patent No.: US 9,004,408 B2
(45) Date of Patent: Apr. 14, 2015

(54) INCLINATION VECTOR CONTROL WITH CONTINUOUS OR QUASI-CONTINUOUS MANEUVERS

(75) Inventor: Vaclav Majer, Annapolis, MD (US)

(73) Assignee: Kratos Integral Holdings, LLC, San Diego, CA (US)

(*) Notice: Subject to any disclaimer, the term of this patent is extended or adjusted under 35 U.S.C. 154(b) by 897 days.

(21) Appl. No.: 12/930,716

(22) Filed: Jan. 13, 2011

(65) Prior Publication Data
US 2012/0181387 A1   Jul. 19, 2012

(51) Int. Cl.
*B64G 1/26*   (2006.01)
*B64G 1/24*   (2006.01)

(52) U.S. Cl.
CPC . *B64G 1/26* (2013.01); *B64G 1/242* (2013.01)

(58) Field of Classification Search
USPC ............... 244/158.4, 158.6, 164, 169, 171.1, 244/171.2
See application file for complete search history.

(56) References Cited

U.S. PATENT DOCUMENTS

| | | | | |
|---|---|---|---|---|
| 3,866,025 | A * | 2/1975 | Cavanagh ................. | 701/13 |
| 4,084,772 | A * | 4/1978 | Muhlfelder ............... | 244/165 |
| 4,825,646 | A * | 5/1989 | Challoner et al. ........ | 60/202 |
| 5,810,295 | A * | 9/1998 | Anzel ........................ | 244/158.6 |
| 5,813,633 | A * | 9/1998 | Anzel ........................ | 244/169 |
| 6,032,904 | A * | 3/2000 | Hosick et al. ............. | 244/169 |
| 6,089,507 | A * | 7/2000 | Parvez et al. ............. | 244/158.8 |
| 6,637,701 | B1 * | 10/2003 | Glogowski et al. ...... | 244/169 |
| 7,720,604 | B1 * | 5/2010 | Cichan et al. ............ | 701/531 |
| 7,918,420 | B2 * | 4/2011 | Ho ............................ | 244/169 |
| 2008/0105788 | A1 * | 5/2008 | Anzel et al. .............. | 244/169 |
| 2009/0020650 | A1 * | 1/2009 | Ho ............................ | 244/169 |
| 2009/0078829 | A1 * | 3/2009 | Ho et al. ................... | 244/169 |
| 2011/0144835 | A1 * | 6/2011 | Ho ............................ | 701/13 |
| 2012/0097797 | A1 * | 4/2012 | Woo et al. ................. | 244/158.6 |

* cited by examiner

*Primary Examiner* — Tien Dinh
*Assistant Examiner* — Steven Hawk
(74) *Attorney, Agent, or Firm* — Procopio Cory Hargreaves & Savitch LLP

(57) ABSTRACT

A satellite inclination control method is provided. The method includes tracking optimal inclination vector control cycles for a satellite in near geosynchronous orbit, using control rates disposed to counter inclination growth of the satellite, where the control rates include continuously or quasi-continuously firings of a thruster, and where the control rates are disposed to provide convergence to the optimal inclination vector control cycles in the presence of variances in orbit determination, maneuver implementation and orbit propagation modeling errors.

6 Claims, 9 Drawing Sheets

INCLINATION VECTOR CONTROL WITH CONTINUOUS OR QUASI-CONTINUOUS MANEUVERS

FIELD OF THE INVENTION

The current invention relates to satellite control. More particularly, the invention relates to geosynchronous station keeping inclination vector target cycles and continuous and quasi-continuous control programs.

BACKGROUND OF THE INVENTION

Managing orbital degradation of geostationary satellites over time is an on-going problem. Because of various external forces, such as forces exerted by the sun and the moon, it is necessary correct this degradation, where it is a goal to extend the lifetime of satellites to a maximum span. Because the lifetime of a satellite depends upon how long its supply of fuel lasts, any saved fuel may be used to extend the life of the satellite. Alternatively, the saved fuel can be removed from the satellite, thereby reducing the overall launch mass of the satellite, allowing more payload to be added to the satellite.

What is needed is a way to provide design and implementation of inclination control strategies, which target optimal minimum fuel target cycles using continuously or quasi-continuously firing thrusters in satellites.

SUMMARY OF THE INVENTION

To address the needs in the art, a satellite inclination control method is provided. The method includes tracking optimal inclination vector control cycles for a satellite in near geosynchronous orbit, using control rates disposed to counter inclination growth of the satellite, where the control rates include continuously or quasi-continuously firings of a thruster, and where the control rates are disposed to provide convergence to the optimal inclination vector control cycles in the presence of variances in orbit determination, maneuver implementation and orbit propagation modeling errors.

According to one aspect of the invention, the thruster firings include stationary plasma thrusters (SPT), xenon ion propulsion systems (XIP), or chemical thrusters.

In another aspect of the invention, the control is disposed to counter a given fraction of a secular perturbation of inclination due to a mean annual drive of Saros and Triple Saros perturbations.

According to a further aspect of the invention, the control is disposed to counter a given fraction of periodic biannual solar perturbations of inclination.

In one aspect of the invention, a combined control compensation is applied to control given fractions of both a secular Saros perturbation and the cyclic biannual perturbation, wherein the secular Saros perturbation comprises an 18-year Saros perturbation and a 54-year Saros perturbation, and the cyclic biannual perturbation comprises a 6-month biannual perturbation.

In yet another aspect of the invention, the continuous control is applied to control an osculating inclination vector to converge in mean to a desired inclination vector target locus.

According to one aspect of the invention, the inclination control includes an acquisition control and a maintenance control, where the acquisition control and a maintenance control are iteratively applied.

In one aspect of the invention, the quasi-continuous control is disposed to ensure an osculating inclination vector of the satellite is centered on an ideal continuously controlled osculating trajectory between episodic inclination maneuver deltas. Here, according to one aspect, the quasi-continuous control is a closed loop feedback control, where a maneuvering delta is determined over a first interval, and where only a solution over a sub-interval of the first interval is retained for a quasi-continuous intra-maneuvering trajectory, where maneuvering times need not be equi-spaced nor frequently spaced.

DETAILED DESCRIPTION

Figure 1:
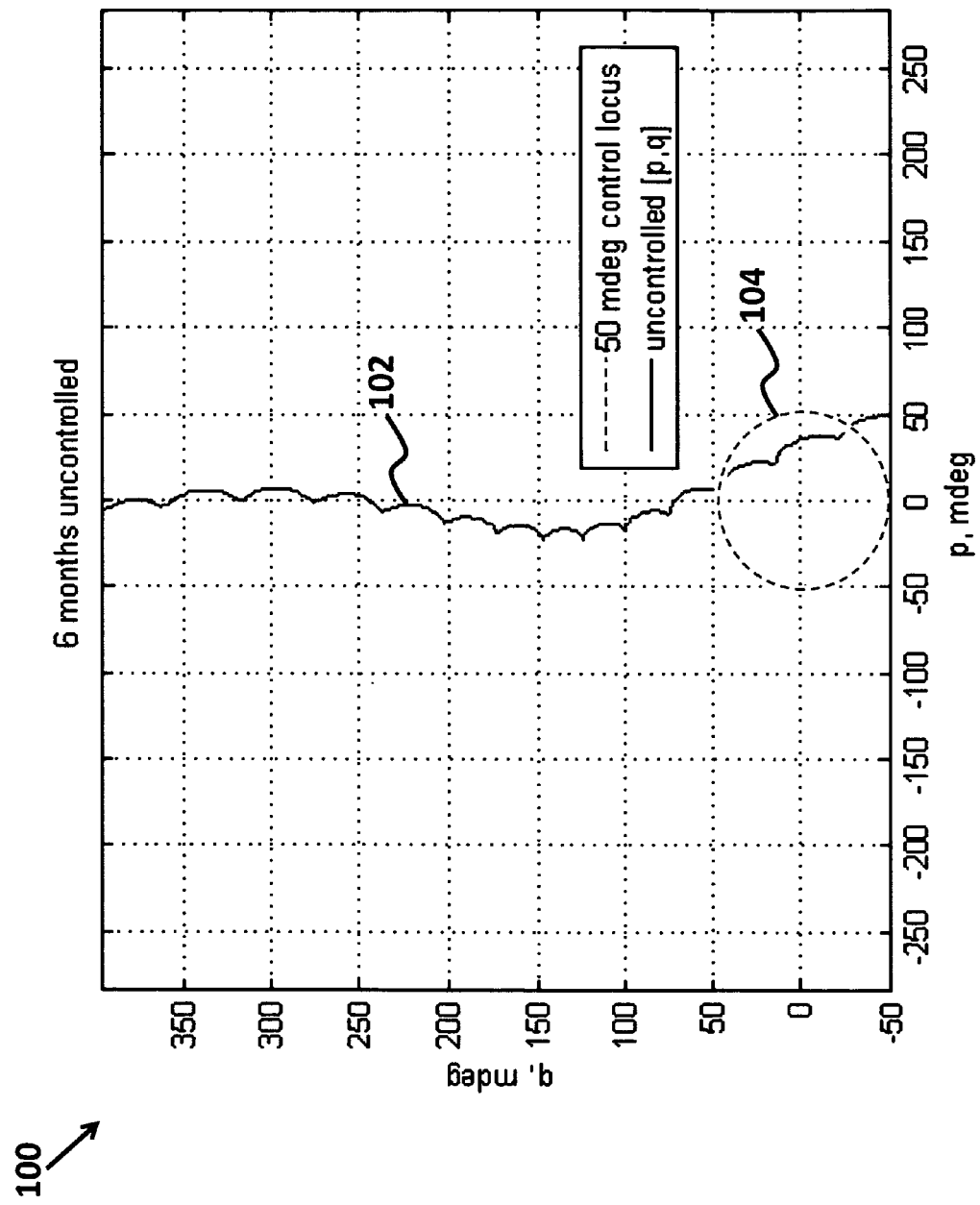
FIG. 1 shows a graph of the effects of the long term secular Saros, biannual solar, and biweekly perturbations over the first 6 months of 2010.

The current invention provides a method of geosynchronous station keeping inclination vector target cycles and continuous and quasi-continuous control programs for tracking them either with low thrust, high specific impulse ion thrusters such as SPTs or XIPs, or with high thrust, moderate specific impulse chemical thrusters.

For the same $\Delta V$, ion thrusters must be fired for a much longer duration than chemical thrusters. That duration may include several shorter firings, however, due either to electric power limitations or the desire to limit long-arc $\Delta V$ losses, or both. Thus, there may be one or more small-$\Delta V$ ion thruster firings each day over several days in order to exert inclination vector station keeping control. The net effect of the quasi-continuous episodic inclination deltas from each firing may be modeled as a continuous inclination vector control rate. Conversely, an optimal continuous control rate program may be implemented by quasi-continuous impulsive inclination deltas, even for large impulsive deltas separated by many orbital revs.

The current invention provides a method of inclination control strategies, which target optimal minimum fuel target cycles using continuously or quasi-continuously firing thrusters. By ensuring that only control rates or deltas, which counter secular inclination are applied, the controls achieve optimal $\Delta V$ performance in the presence of orbit determination, maneuver implementation, and orbit propagation modeling errors.

Inclination trajectories are denote by $$t \mapsto i = \begin{bmatrix} p \\ q \end{bmatrix} \equiv \begin{bmatrix} 2\tan(i/2)\cos(\Omega) \\ 2\tan(i/2)\sin(\Omega) \end{bmatrix}$$

the true of date non-singular inclination vector elements of a geosynchronous vehicle at julian day, t, from julian epoch J2000. Here i∈[−180, +180] deg is the orbit inclination, and $\Omega$ is the right ascension of the orbit ascending node. Clearly, (r, θ)=(2 tan(i/2), $\Omega$) are the polar coordinates of the cartesian point (p, q), and like all polar coordinates, are singular at the origin, (p, q)=(0, 0). The origin, of course, defines geostationary inclination and so plays a central role in geosynchronous operations. For this reason only non-singular inclination elements, [p, q], are used in this discussion.

The time evolution of near-geosynchronous inclination is due to the nutation and precession of the orbital angular momentum vector in the presence of oblate earth, lunar, and solar gravitational torques. There are five principal periodic signatures, representative values for the period and amplitude of which are listed in Table 1. On the scale of geosynchronous inclination station keeping tolerances, the amplitude of the diurnal cycle is negligible and will be ignored in this discussion. At the other extreme, the period and amplitude of the Saros and triple Saros cycles are so large as to appear as secular perturbations requiring control.

TABLE 1

Saros cycle perturbations present as secular drift in roughly the q-direction and require control; the diurnal perturbation is never controlled; the biweekly and biannual perturbations may or may not be controlled depending on the vehicle latitude tolerance.
Periodic Perturbations of Inclination

| cycle | period | amplitude |
|---|---|---|
| diurnal | 12 hours | 0.1 mdeg |
| biweekly | 14 days | 2.0 mdeg |
| biannual | 6 months | 22.5 mdeg |
| saros | 18 years | 350.0 mdeg |
| triple saros | 54 years | 7500.0 mdeg |

The i=[p q] perturbation dynamics in the neighborhood of the origin are given by $$\frac{di}{dt} = A\phi(\alpha) + B\psi(\beta) + C\chi(\gamma) + \delta(t, i).$$

Perturbation coefficient matrices, A, B, and C, acting on basis function vectors $\phi$, $\psi$, and $\chi$, depending on right ascension of the moon, t↦ $\alpha$(t), right ascension of the sun, t↦ $\beta$(t), and right ascension of the ascending node of the moon's orbit in the ecliptic, t↦ $\gamma$(t), characterize the biweekly lunar, biannual solar, and long term quasi-secular Saros cycle lunar perturbations, respectively. The design of the control function, $\delta$( ), is the one aspect of the current invention. The right hand side matrix and vector perturbation elements are defined by $$A = \begin{bmatrix} A_{11} & A_{12} \\ A_{21} & A_{22} \end{bmatrix}, \phi(\alpha) = \begin{bmatrix} \cos(2\alpha) \\ \sin(2\alpha) \end{bmatrix}$$

for the biweekly lunar terms;

$$B = \begin{bmatrix} B_{11} & B_{12} \\ B_{21} & B_{22} \end{bmatrix}, \psi(\beta) = \begin{bmatrix} \cos(2\beta) \\ \sin(2\beta) \end{bmatrix}$$

for the biannual solar terms; and $$C = \begin{bmatrix} C_{10} & C_{11} & C_{12} & C_{13} & C_{14} \\ C_{20} & C_{21} & C_{22} & C_{23} & C_{24} \end{bmatrix},$$

$$\chi(\gamma) = \begin{bmatrix} 1 \\ \cos(\gamma) \\ \sin(\gamma) \\ \cos(2\gamma) \\ \sin(2\gamma) \end{bmatrix}$$

for the dominant Saros cycle terms. Values for the elements of coefficient matrices A, B, and C may be found in the literature. Expressions for computing the lunar arguments $\alpha$ and $\gamma$, and the solar argument, $\beta$, are also found in the literature. FIG. 1 shows an uncontrolled orbit graph 100 of the effects of the long term secular Saros, biannual solar, and biweekly perturbations over the first 6 months of 2010. It is sometimes convenient to suppress the biweekly perturbations by smoothing the osculating inclination elements. Suppressing the biweekly cycle is equivalent to setting A=0 above; the resultant inclination trajectory, t↦ î, defines the mean inclination vector. The secular Saros perturbation components corresponding to C are the mean annual drive. As shown in FIG. 1, during the first six months of 2010 the secular mean annual drive is in SSE to NNW direction of the [p, q]-plane; the modulation of the biannual solar effect is clearly evident, as are the scallops 102 which characterize the biweekly lunar effect. A typical 50 mdeg control locus 104 is shown for reference. The control function is $\delta$=0; that is, no control.

As indicated above, the two control strategies we consider are:
Maximum Compensation: controls both the secular Saros perturbations and the cyclic biannual perturbations (see FIG. 2). Max compensation is characterized by a constant mean inclination target; that is, dî/dt=0.
Minimum Fuel: controls only the secular Saros perturbations (see FIG. 3). Min fuel is characterized by cyclic mean inclination satisfying dî/dt=B$\psi$($\beta$). By leaving the biannual solar cycle uncontrolled, min fuel saves 2.5% to 4% of the fuel used by the maximum comp strategy, where on a nominal 15 year spacecraft design life, the difference corresponds to 4.5 to 7.5 months of spacecraft fuel life, depending on where in the 18 year Saros cycle the spacecraft life cycle falls.

Figure 2:
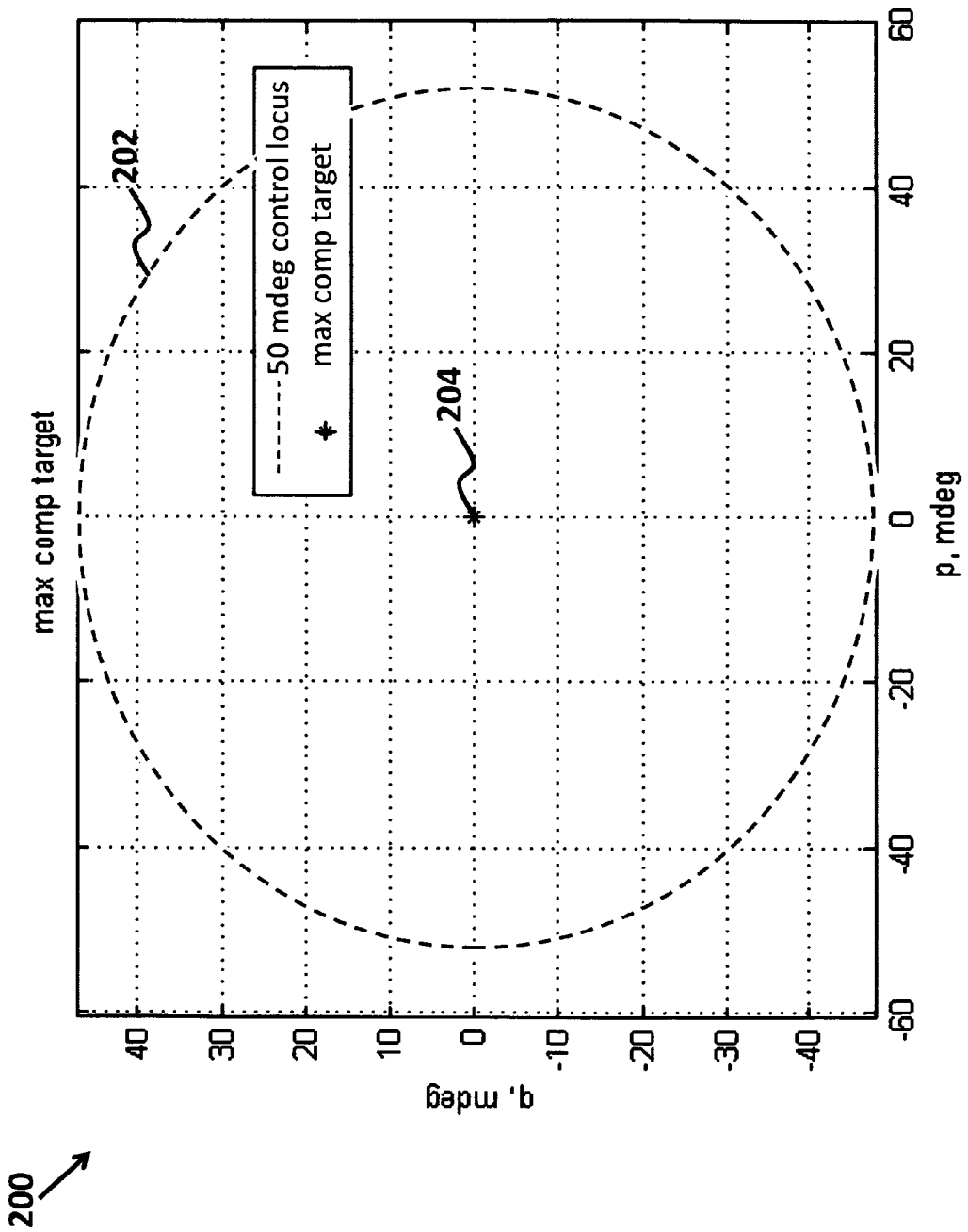
FIG. 2 shows a graph having the maximum compensation target locus as a point, and the result of nulling both the long term secular and the biannual cyclic perturbations, according to one embodiment of the current invention.

FIG. 2 shows a maximum compensation target graph 200 were the maximum compensation target locus 202 is a point, and a 50 mdeg. control locus 204, and the result of nulling both the long term secular and the biannual cyclic perturbations. The ideal max comp mean inclination remains fixed at this point.

Figure 3:
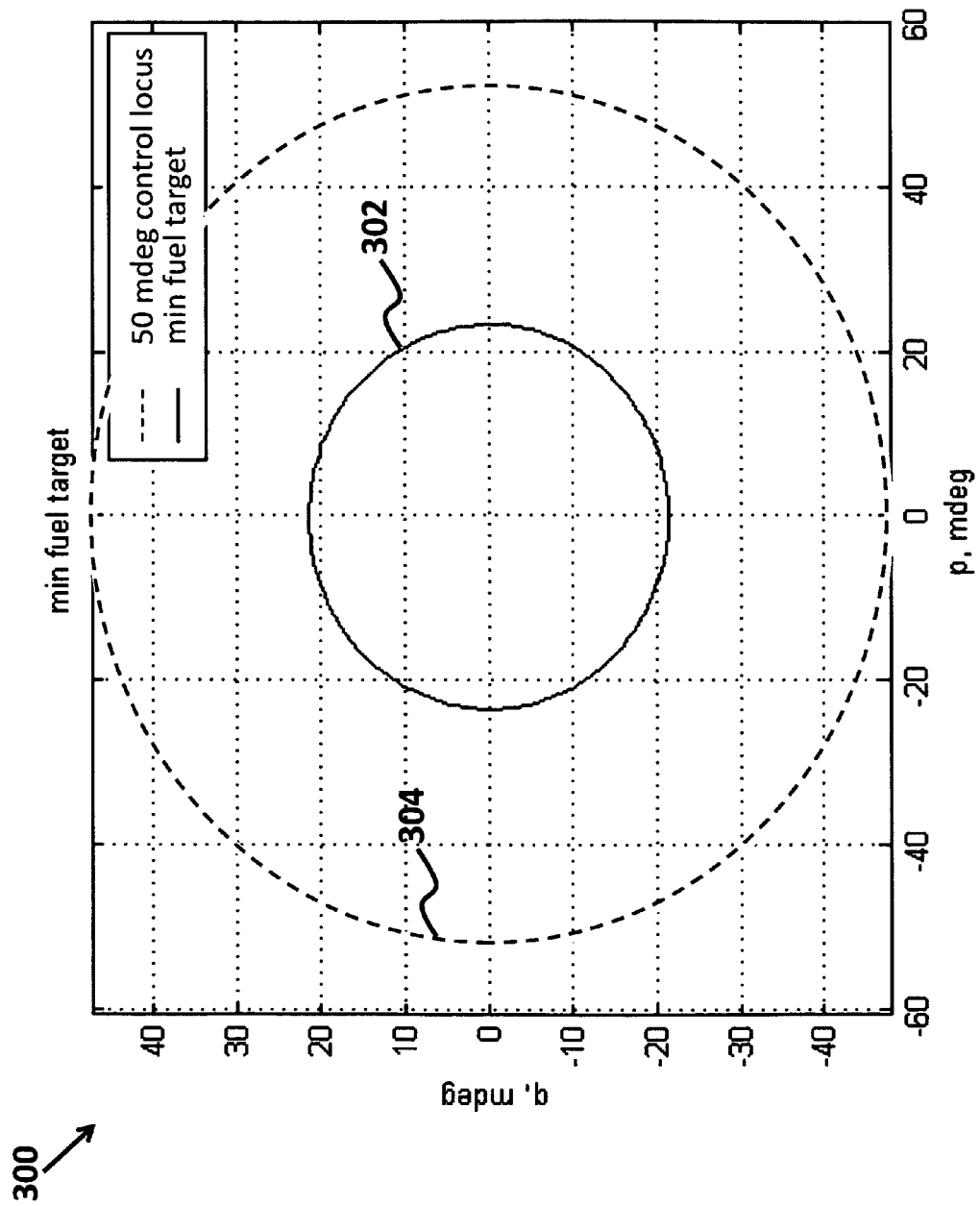
FIG. 3 shows a graph of the minimum fuel target locus is a circle of radius 22.5 mdeg, the result of nulling only the secular perturbations, allowing the biannual solar perturbations to persist, according to one embodiment of the current invention.

FIG. 3 shows a minimum fuel target graph 300 of the minimum fuel target locus is a circle 302 of radius 22.5 mdeg, and a 50 mdeg. control locus 304, the result of nulling only the secular perturbations, allowing the biannual solar perturbations to persist. The ideal min. fuel mean inclination follows this locus over 6 months.

For continuous inclination control, given the initial value problem, $$\frac{di}{dt} = A\phi(\alpha) + B\psi(\beta) + C\chi(\gamma) + \delta(t),$$

$$i(t_0) = i_0 = [p_0, q_0],$$

the object of continuous station keeping inclination control is to design control function, $t \mapsto \delta$, such that the osculating trajectory, $t \mapsto i$, acquires a desired mean inclination target locus $t \mapsto j$ in the [p, q] plane and then maintains that target locus. The current invention provides such control functions for the maximum compensation and minimum fuel target loci, a point and a circle, respectively.

Since the uncontrolled i dynamics are independent of i, we have that the difference $$i_2(t) - i_1(t) = i_2(t_0) - i_1(t_0),$$

of two uncontrolled trajectories is constant, so that trajectories starting from different initial vectors are congruent rigid body translations of one another. Thus given, target locus $t \mapsto j$, the acquisition control $$\delta_a(t; t_0, T) = \frac{j(t_0) - \hat{i}(t_0)}{T} \text{ for } t \in [t_0; t_0 + T],$$

$$\delta_a(t; t_0, T) = 0 \text{ for } t \in [t_0 + T, \infty),$$

removes any station keeping mean initialization error, $\hat{i}(t_0) - j(t_0)$, over a T day acquisition phase. Here $\hat{i}$ is the mean inclination corresponding to osculating inclination i. The osculating trajectory converges in mean to the mean target locus over T days.

Underlying the initial acquisition phase is persistent maintenance in mean of the target locus. The maintenance control is given by $$\delta_m(t;\zeta) = -[\zeta B\psi(\beta) + C\chi(\gamma)] \text{ for } t \in [t_0, \infty],$$

where $\zeta = 1$ for the maximum compensation strategy and $\zeta = 0$ for the minimum fuel strategy.

The complete acquisition plus maintenance control program is $$\delta(t;t_0,T;\zeta) = \delta_a(t;t_0,T) + \delta_m(t;\zeta).$$

Figure 4:
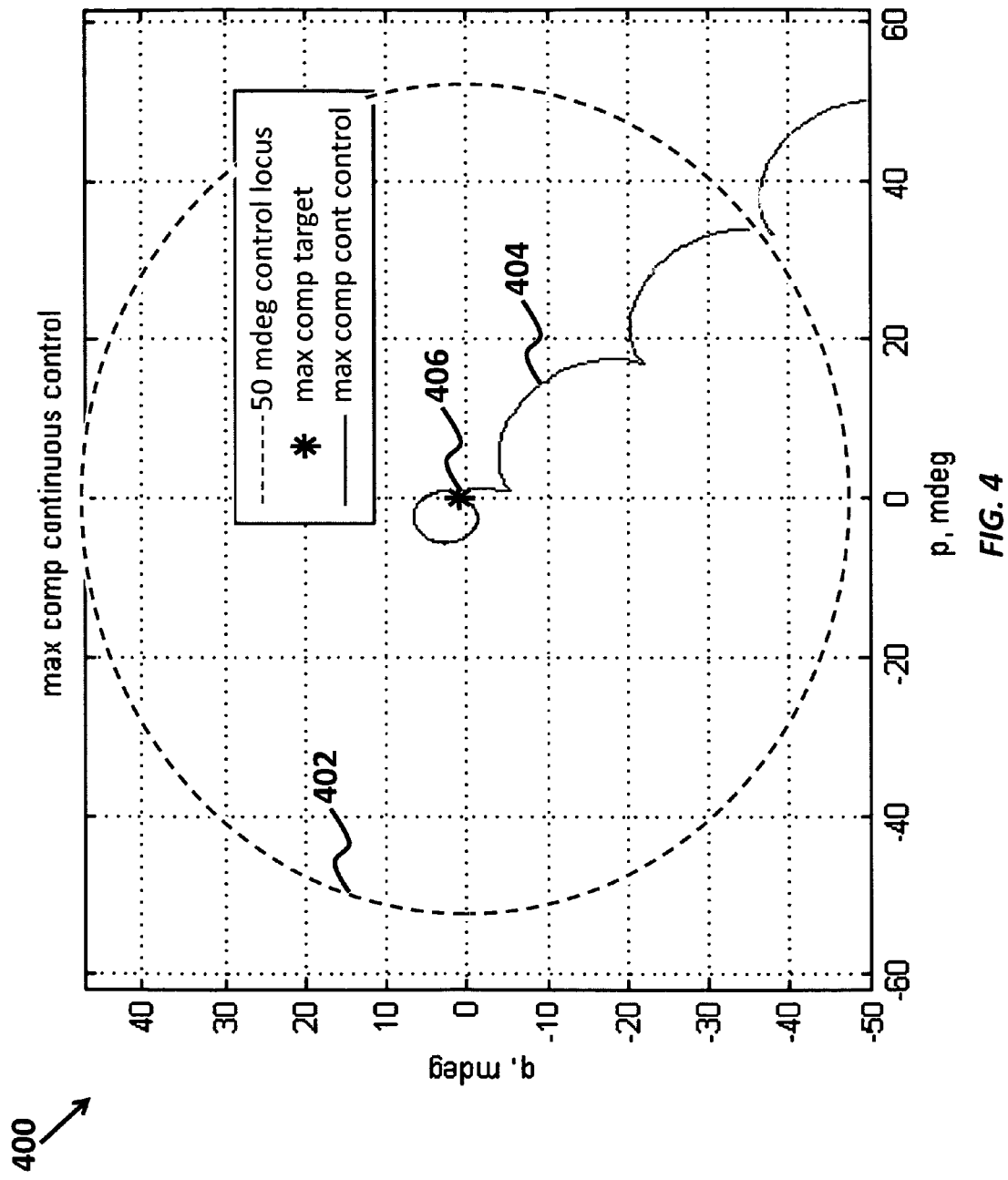
FIGS. 4-5 show graphs of examples of six months of maximum compensation and minimum fuel, respectively, each with a 42 day acquisition phase from a poorly initialized out-of-tolerance initial inclination, according to the current invention.
Figure 5:
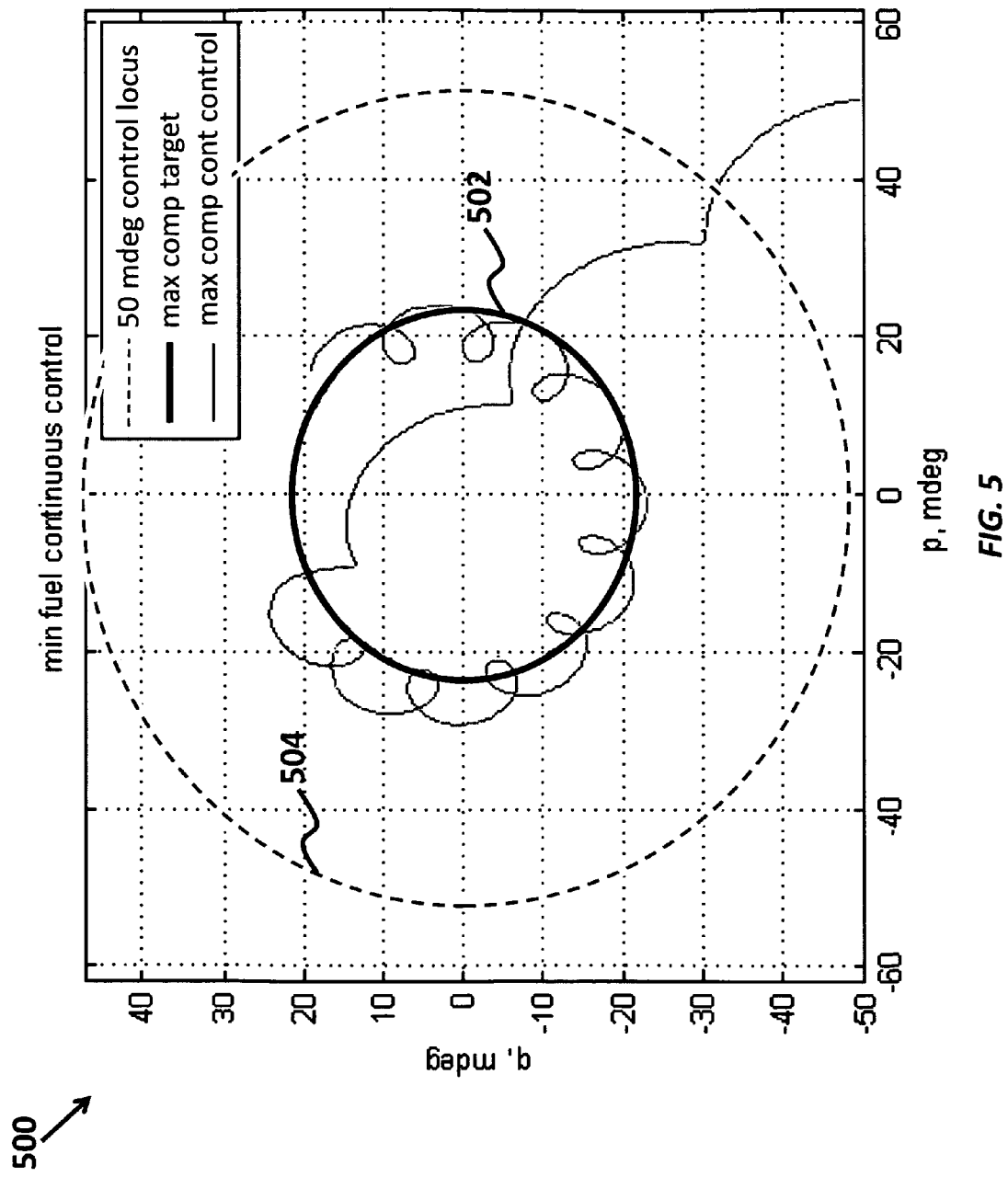

FIGS. 4 and 5 show examples of six months of maximum compensation and minimum fuel, respectively, each with a 42 day acquisition phase from a poorly initialized out-of-tolerance initial inclination.

An important attribute of this invention is that a continuous control program is applied to the osculating inclination trajectory to achieve convergence in mean to a mean inclination target locus.

FIG. 4 shows a maximum compensation continuous control graph 400 from the initial inclination at [−50, −50] mdeg outside of the 50 mdeg hard limit control locus 402, the acquisition control drives the osculating inclination 404 toward the fixed max comp mean inclination target 406 at the center of the control locus. The maintenance control holds the target in mean, leaving only the biweekly lunar cycle uncontrolled. And as shown in FIG. 5, the acquisition control converges to the 22.5 mdeg min fuel target locus 502 interior to the 50 mdeg control locus 504. The maintenance control holds the target in mean, leaving both the biweekly lunar cycle and the biannual solar cycle uncontrolled.

In practice, the maintenance phase does not run open loop in the open-ended interval $[t_0, 1)$. Instead, episodic orbit determination corrects the propagated $i(t_k)$ at OD epochs $t_k$, k=0, 1, 2, .... The initial value problem is then re-solved in interval $[t_k, 1)$, and the re-acquisition control automatically removes any orbit propagation abutment error revealed by orbit determination over the previous station keeping control cycle $[t_{k-1}, t_k]$. The algorithm is thus self-correcting on the time scale of the station keeping control cycle. And neither is the control program continuous in practice. The ideal continuous control program serves as the osculating target for the quasi-continuous discrete control program to be implemented by the vehicle.

Continuous inclination control is not practical in on-station operations for most spacecraft designs since it would preclude the usual 1 rev/day pitch rotation to maintain nadir-pointing payload, where, the continuous control program is very nearly constant in magnitude and inertial direction over one orbital day. Instead, the continuous control program is replaced by episodic inclination deltas. There may be one or more deltas per day (e.g., 4 maneuvers per 1 day with ion plasma thruster station keeping) or one or more days per delta (e.g., 1 maneuver every 14 days for traditional chemical thruster station keeping).

The quasi-continuous control program ensures that the vehicle's osculating inclination trajectory, $t \mapsto h$, is centered on the ideal continuously controlled osculating trajectory, $t \mapsto i$, between episodic inclination maneuver deltas, $\Delta h_j$ at times $t_j$, j=1, .... The deltas are given by $$\Delta h_j = i(t_{j+1}) - h(t_{j+1}),$$

where $t \mapsto h$ satisfies the series of uncontrolled initial value problems, $$\frac{dh}{dt} = A\phi(\alpha) + B\psi(\beta) + C\chi(\gamma), \text{ for } t \in [t_{j-1}, t_{j+1}],$$

$$h(t_j - 1) = h_{j-1}, \text{ with}$$

$$h_0 = i_0.$$

Figure 6:
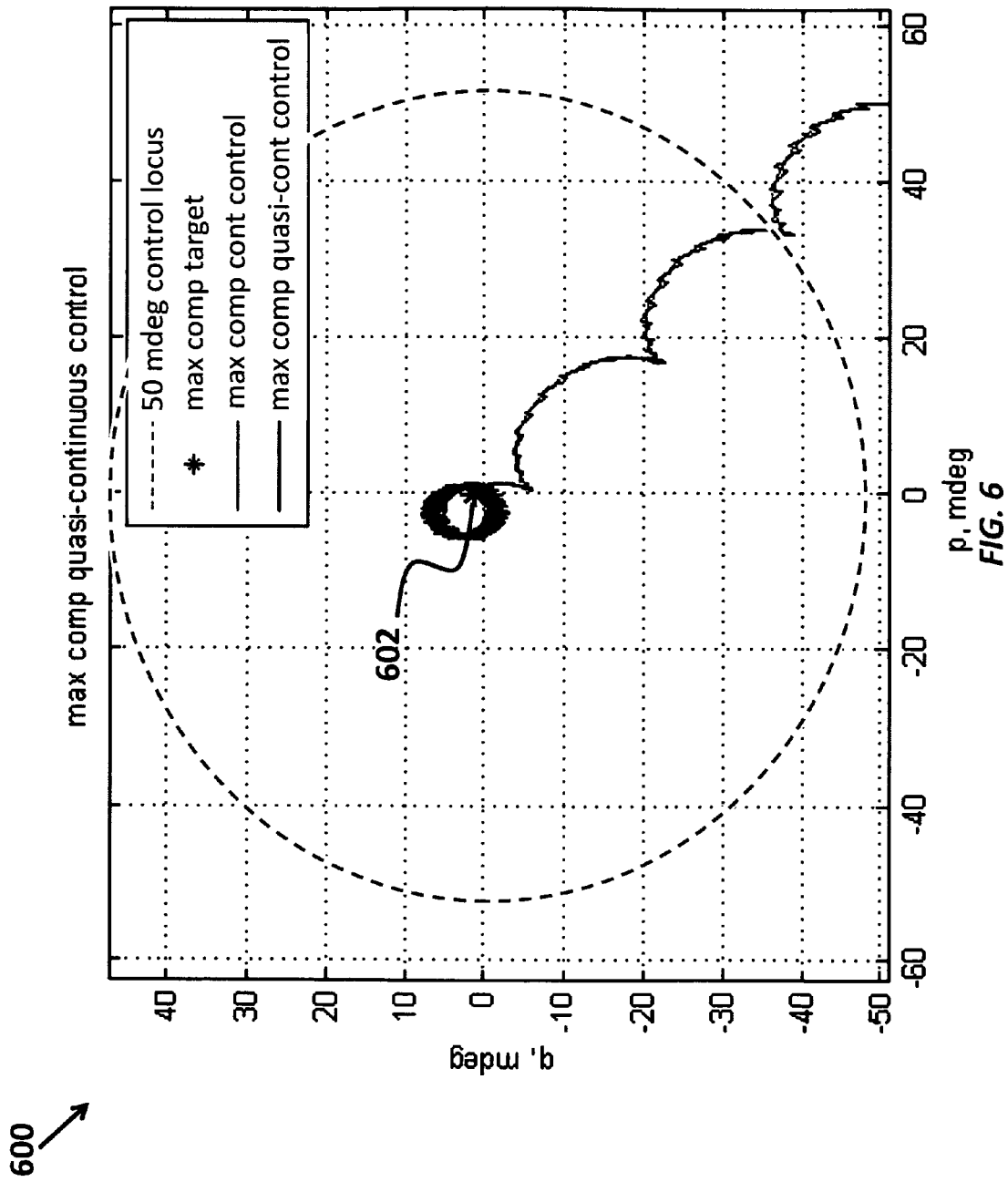
FIGS. 6-7 show the daily quasi-continuous max compensation and min fuel control programs corresponding to the continuous control program examples of FIGS. 4 and 5, according to embodiments of the current invention.
Figure 7:
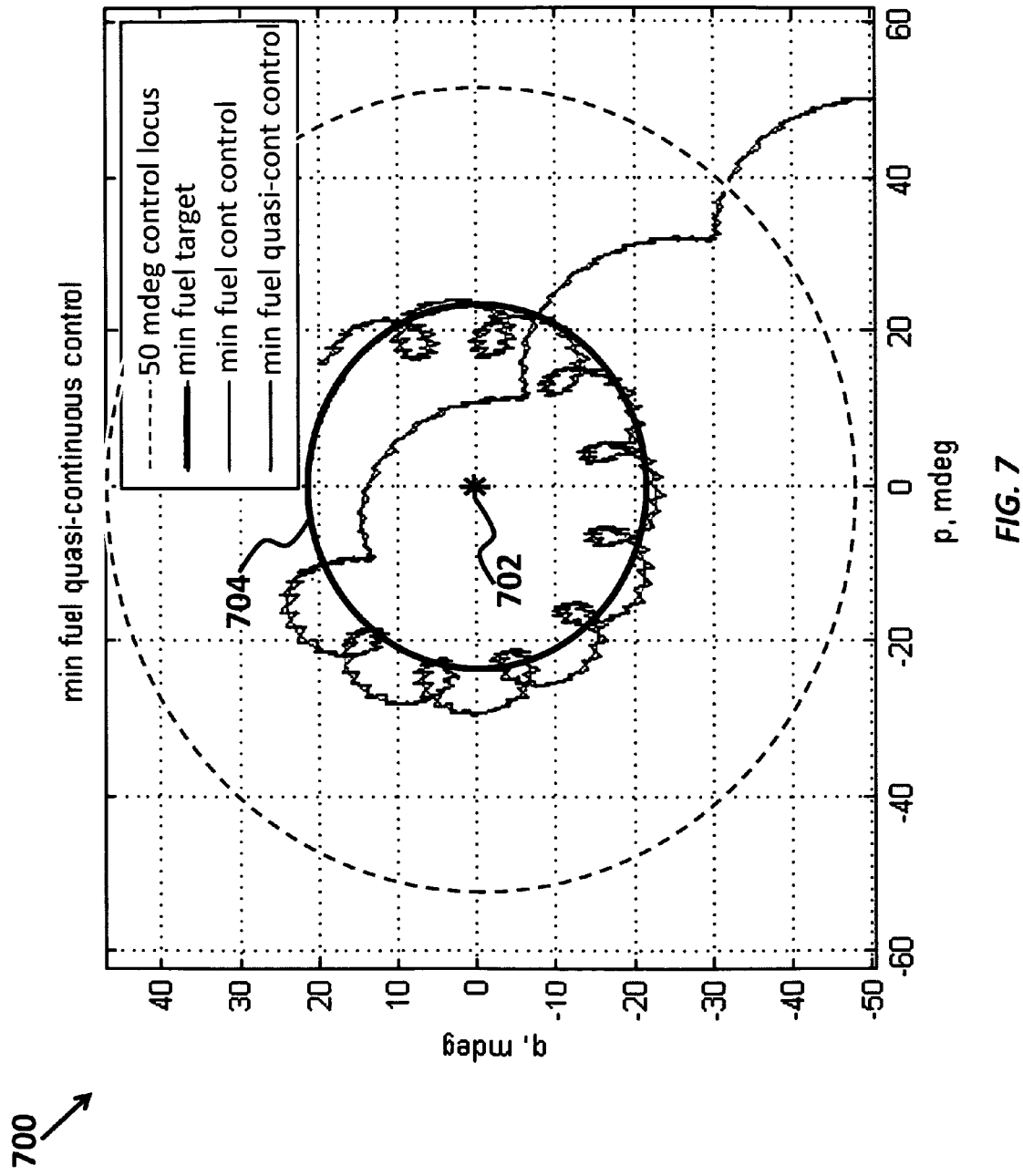
Figure 8:
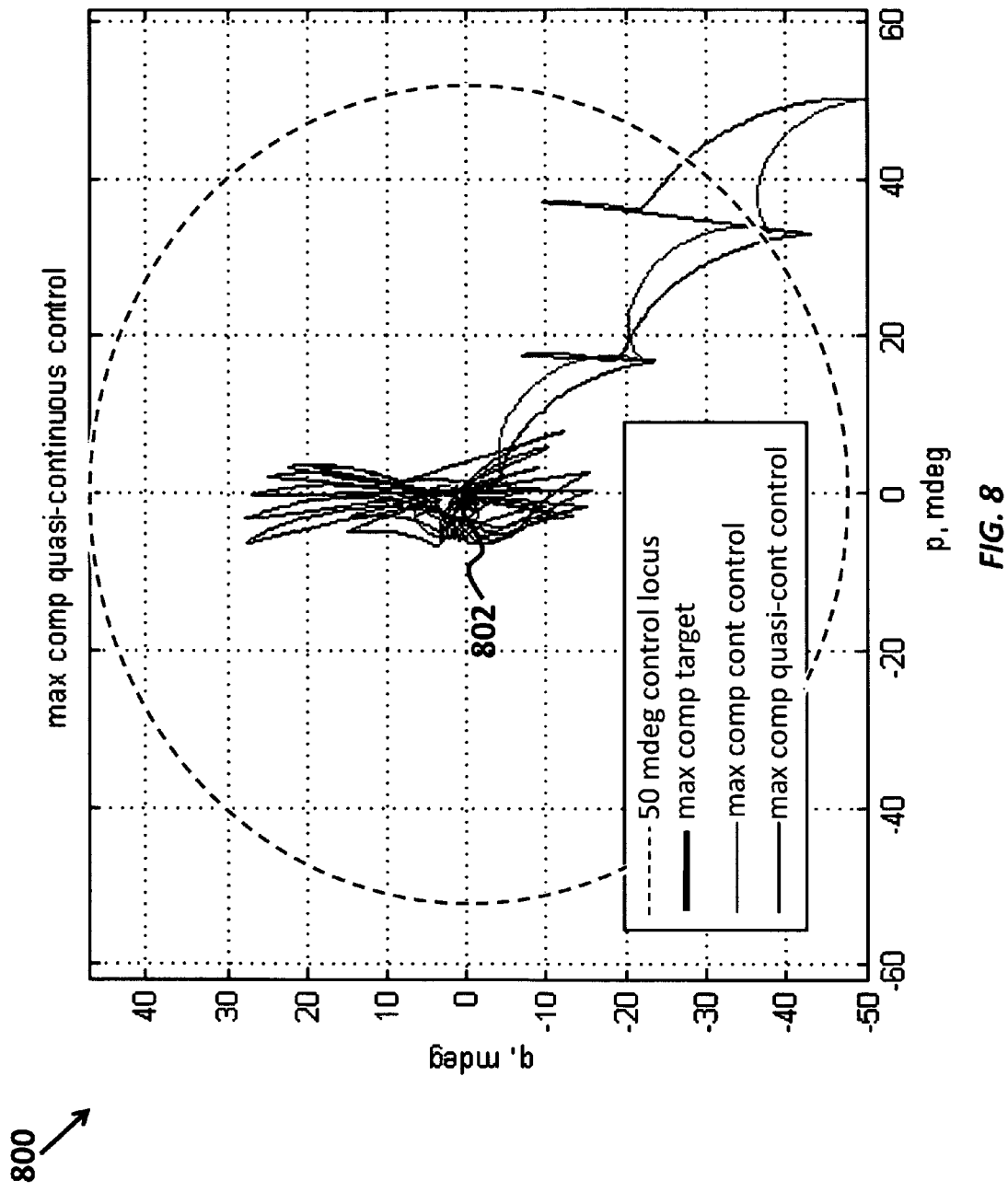
FIGS. 8-9 show biweekly quasi-continuous control programs for the examples of FIGS. 4 and 5, according to embodiments of the current invention.
Figure 9:
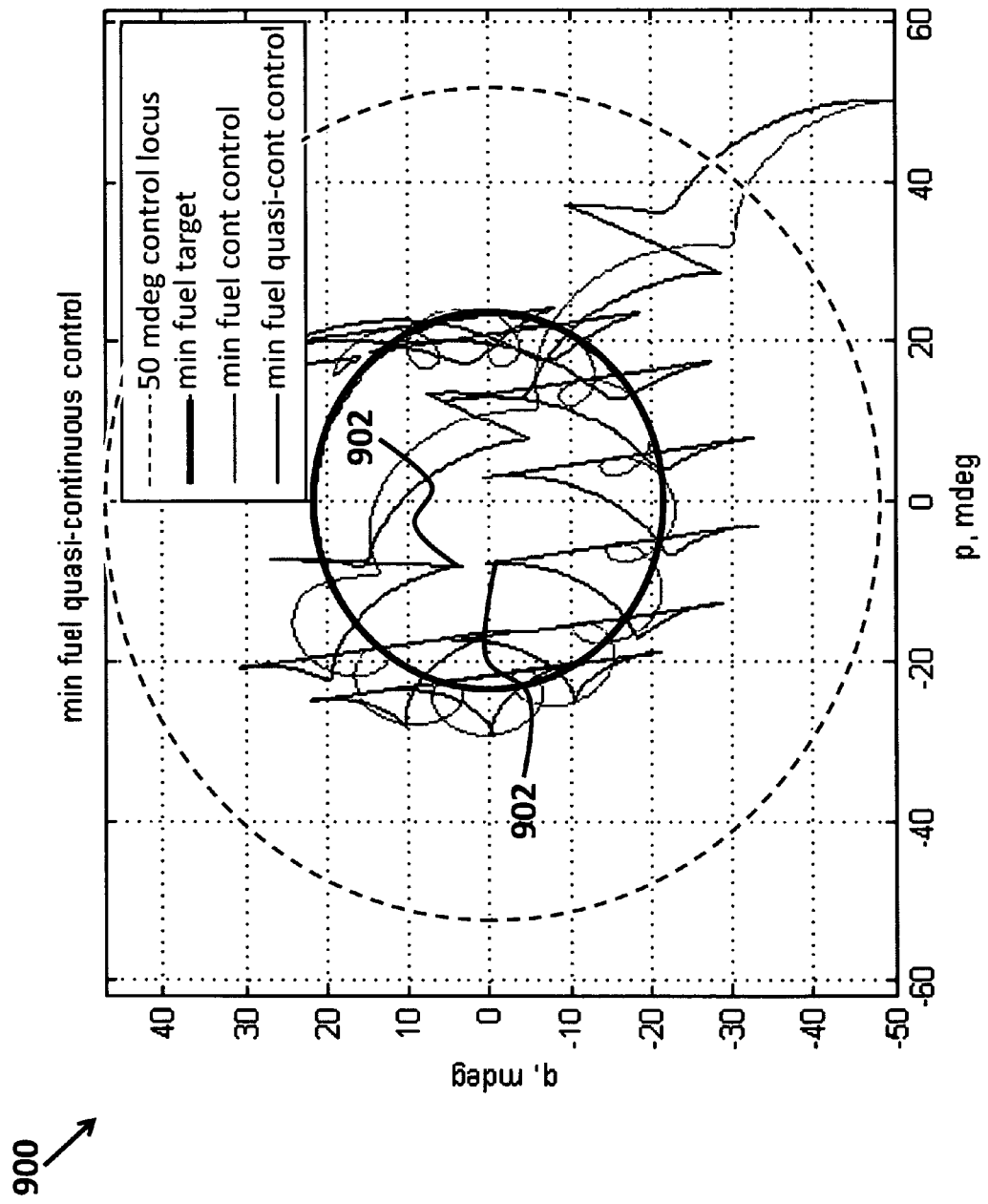

Observe that this is a closed loop feedback control in that determining the maneuver delta at time requires propagation of the uncontrolled trajectory over the interval $[t_j-1\ t_j+1]$. Only the solution over the interval $[tj-1\ tj]$ is retained for the quasi-continuous intra-maneuver trajectory. The maneuver times, $t_j$, need not be equi-spaced, and neither need they be frequently spaced. FIGS. 6 and 7 show the daily quasi-continuous max compensation and min fuel control programs corresponding to the continuous control program examples above; FIGS. 8 and 9 show biweekly quasi-continuous control programs for the same scenarios.

FIG. 6 shows a graph of maximum compensation quasi-continuous control 600, where shown are how daily maneuvers track the continuous control locus 602 as it acquires the control point and holds it in mean. Only the biweekly perturbations are uncontrolled.

FIG. 7 shows a graph of minimum fuel quasi-continuous control 700, where shown are how daily maneuvers track the continuous control locus 702 as it acquires the min fuel control cycle 704 and holds it in mean. Only the long-term secular perturbations are controlled.

FIG. 8 shows a graph of maximum quasi-continuous control 800, where shown are how biweekly maneuvers are used to track the continuous control locus 802 are larger but the net effect is the same as for daily control. Note that the maintenance phase max comp inclination deltas are not parallel since they must null the solar cycle as well as the long-term Saros cycles. Daily max comp deltas are also not parallel, but the effect is not visible on the scale of FIG. 6.

FIG. 9 shows a graph of minimum fuel quasi-continuous control 900, where shown are how parallel biweekly maintenance phase maneuvers track the continuous control locus 902, which floats with the biannual solar cycle. No transverse-secular control is required, and along-secular control is constant.

The fuel use for continuous inclination control is proportional to the net continuous inclination authority, I, $$I(t_0, T, \zeta) = \int_s \delta(s; t_0, T, \zeta) ds.$$

The quasi-continuous control authority, J, is the sum of the inclination deltas, $$J(t_0, T, dT, \zeta) = \sum_j |\Delta h_j|,$$

supplied by the quasi-continuous controls, $\Delta h_j$ with maneuver frequency, 1/dT. The more frequent are the maneuvers, the smaller is each maneuver. The net inclination authority, however, remains virtually constant for each strategy, independent of maneuver frequency. That is, $$\lim_{dT \to 0} J(t_0, T, dT, \zeta) = I(t_0, T, \zeta),$$

for fixed strategy, $\zeta$. The quasi-continuous control authority ratio for maneuver frequency, 1/dT, using strategy $\zeta$ is $$f(dT, \zeta) = \frac{J(t_0, T, dT, \zeta)}{I(t_0, T, \zeta)} = \frac{J(t_0, T, dT, \zeta)}{J(t_0, T, dT = 0, \zeta)}.$$

The implementation defined in this description has the property that $f_q(dT, \zeta) < 1$ for $0 < dT$; the savings are essentially the discretization error of the quasi-continuous approximation to the continuous control: the discrete control "cuts corners" relative to the continuous control. The fuel savings of min fuel relative to max comp are characterized by $$g(dT) = \frac{J(t_0, T, dT, \zeta = 0)}{J(t_0, T, dT, \zeta = 1)}.$$

Table 2 summarizes the performance of the continuous and quasi-continuous controls for the four example scenarios of the previous section.

TABLE 2

Inclination Control Authority and Efficiency

| | | MaxComp | | MinFuel | | |
|---|---|---|---|---|---|---|
| Scenario | dT days | J mdeg | 1 − f % | J mdeg | 1 − f % | 1 − g % |
| Continuous Mnvrs | 0 | 397.26 | 0.000 | 384.08 | 0.000 | 3.43 |
| Daily Mnvrs | 1 | 397.25 | 0.003 | 384.03 | 0.013 | 3.44 |
| BiWeekly Mnvrs | 14 | 396.35 | 0.230 | 383.36 | 0.187 | 3.38 |

Minimum fuel uses 3.4% less fuel than maximum compensation over the first six months of 2010. Decreasing the frequency of maneuvers offers a very slight fuel savings due to the "averaging" effect of the larger maneuver deltas. Biweekly maneuvers exceed the control authority of ion thrusters, of course.

This invention provides the design and implementation of inclination control strategies, which target optimal minimum fuel target cycles using continuously or quasi-continuously firing thrusters. By ensuring that only control rates or deltas, which counter secular inclination are applied, the controls achieve optimal $\Delta V$ performance in the presence of orbit determination, maneuver implementation, and orbit propagation modeling errors.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example, the control applications may be episodic with arbitrary or irregular period. The reference trajectory may be corrected or re-defined during any cycle based on the results of routine orbit determination or following orbit adjustments for purposes other than station keeping.

All such variations are considered to be within the scope and spirit of the present invention as defined by the following claims and their legal equivalents.

What is claimed:

1. A satellite inclination control method comprising:
tracking inclination vector cycles for a satellite in near geosynchronous orbit; and
performing a plurality of thruster firings of quasi-continuous inclination deltas each day over several days to counter growth of the inclination vector cycles;
wherein the quasi-continuous inclination deltas ensure that an osculating inclination vector of the satellite is centered on an ideal continuously controlled osculating trajectory between episodic inclination maneuver deltas;
the quasi-continuous inclination deltas from each thruster firing providing an approximation to a continuous inclination vector control rate; and
wherein the quasi-continuous inclination deltas provide a closed loop feedback control in which a maneuvering delta is determined over a first interval, and only a solution over a sub-interval of the first interval is retained for a quasi-continuous intra-maneuvering trajectory.

2. The method of claim 1, wherein the plurality of thruster firings comprises $\Delta V$ firings of ion thrusters.

3. The method of claim 1, wherein performing a plurality of thruster firings of quasi-continuous inclination deltas comprises
applying only the inclination deltas which counter a secular perturbation of inclination.

4. A satellite inclination control method comprising:
tracking inclination vector cycles for a satellite in near geosynchronous orbit; and
performing a plurality of thruster firings of quasi-continuous inclination deltas each day over several days to counter growth of the inclination vector cycles according to a control function having a predetermined minimum fuel target;
the control function controlling only secular Saros perturbations while leaving a biannual solar cycle uncontrolled to minimize fuel use.

5. The method of claim 4, wherein the minimum fuel target locus which minimizes the fuel use is a circle of radius 22.5 mdeg.

6. The method of claim 1, wherein the continuous inclination vector control rate is applied to control the osculating inclination vector to converge in mean to a desired inclination vector target locus.

* * * * *